April 19, 1955 H. H. BRUDERLIN ET AL 2,706,638

AUTOMATIC SOUND REPRODUCING DEVICE

Filed March 27, 1951 2 Sheets-Sheet 1

INVENTORS
HENRY H. BRUDERLIN AND
GEORGE K. MANN
BY J. Edwin Coates
ATTORNEY

INVENTORS
HENRY H. BRUDERLIN AND
GEORGE K. MANN
BY J. Edwin Coates
-ATTORNEY-

1

2,706,638

AUTOMATIC SOUND REPRODUCING DEVICE

Henry H. Bruderlin, Los Angeles, and George K. Mann, Santa Monica, Calif.

Application March 27, 1951, Serial No. 217,789

10 Claims. (Cl. 274—4)

This invention relates to sound reproducing devices and more particularly to devices of the type which utilizes thin flexible material in tape form as the medium upon which the sound is recorded and from which it is reproduced. While the invention may be used with any type of recording tape such as those which have an embossed or inscribed sound track, the preferred form makes use of magnetic recording tape.

Many types of magnetic tape recorders and reproducers are already known but they all operate in substantially the same way and are composed of substantially the same elements. They consist generally of a pair of storage reels on one of which the tape is wound as it is drawn off the other during the process of recording or reproducing sound, one or more magnetic devices over which the tape passes for recording or reproducing sound or erasing an existing message, a motor and drive unit for causing the tape to travel over the magnetic devices at a substantially uniform speed, and amplifiers and control devices for reproducing the recorded sound and controlling the mechanism as desired by the operator.

Some of these devices have means for shifting the magnetic recording and reproducing devices laterally with respect to the tape, so that two or more sound tracks may be recorded side by side on a single strip of tape, and they usually include a reversing device so that one sound track will be used with each direction of tape movement. While such devices can produce a rather long continuous or repeated message they are heavy, bulky, and expensive and do not have provision for automatic repetition or reversal so that they are not well suited for the field of on-the-spot advertising and display work.

This type of work can be better performed by another type of known reproducing mechanism which incorporates an endless belt or loop of tape traversing the recording mechanism and a magazine in which a plurality of folds of the loop pile up as they travel therethrough. The magazine must be quite large for a small length of tape since the folds must be loose enough to slide over each other without jamming, and hence a device of a convenient size can provide for a message of little more than three minutes duration. This is a serious drawback to the use of such devices for the intended purpose.

The reproducer of the present invention overcomes the deficiencies of the prior art devices by a unique arrangement of parts and the provision of novel automatic reversing and shifting mechanism which combine to give a possible length of message of thirty minutes to an hour, comparable to the first type mentioned above, together with the compactness and relative simplicity of the second type. It further incorporates means operated by the tape for automatically actuating any desired external circuit or circuits at any time during the sound reproduction or the travel of the tape.

The novel device disclosed herein comprises generally a pair of storage reels located closely adjacent to each other, preferably mounted on a single journal shaft, adapted to deliver and gather the tape as needed, a pair of idler rollers to support and guide the tape, and a recording or pickup head located between the rollers, over which the tape slides to record or reproduce sound. The reels are driven by a phonograph motor or the like through conventional gearing and a drive bushing. A plurality of spring biased contact arms are located in sliding contact with one surface of the tape and the latter is provided with appropriately located conductive areas to short or complete a circuit through selected pairs of contact arms to produce signals. Some of these signals are used to actuate external devices such as lights, sign changing mechanisms, etc., and others are used to actuate means for reversing the effective driving action of the motor. The novel construction and cooperative relation of the rollers or guides with the tape determines the lateral position of the latter in accordance with its direction of movement and provides means for automatically shifting the tape laterally on reversal of its direction of movement.

2

These and other novel features of construction and operation will be brought out more fully and described in detail in the subsequent description taken in connection with the accompanying drawings, in which.

Figure 1:
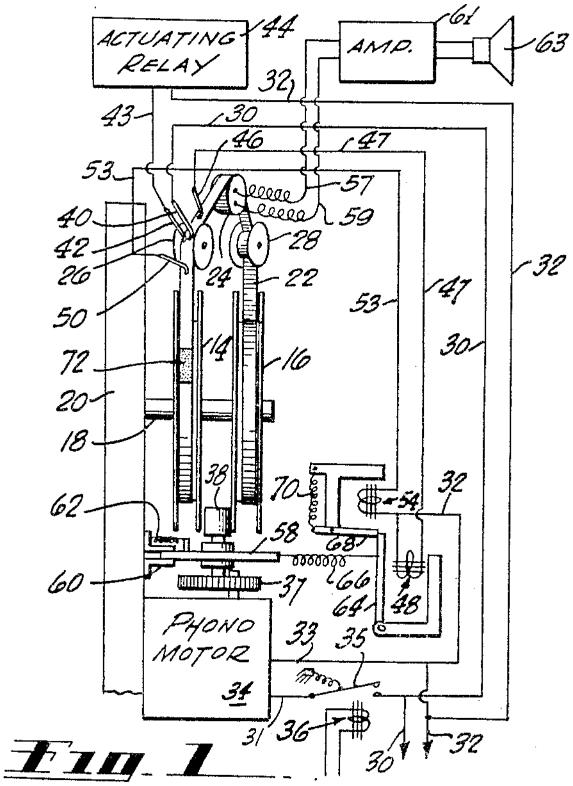
Figure 1 is a diagrammatic view of the invention showing the general mechanical arrangement of the principal parts of the device together with the actuating circuits.

Referring now to Figure 1 it will be seen that the mechanism includes a pair of storage reels 14 and 16 freely rotatably mounted on shaft 18 which in turn may be mounted on any suitable support 20. If desired, a light braking force may be applied to the reels by spring washers, not shown, or other known means. These reels serve to store a length of record tape 22, such as magnetic tape, and upon suitable rotation serve to transfer the tape from one reel to the other. In the course of such transfer the tape travels longitudinally over the sound pickup head 24 and its path is guided by rollers 26 and 28.

Conductors 30, 32 lead to a conventional source of electric power for actuating the various devices placed in circuit with them. Conductors 31 and 33 lead to the motor 34 and the circuit includes a switch 35 which may be hand operated but preferably is spring biased to an open position and is drawn to circuit closing position by a solenoid 36 which is remotely controlled by any desired means such as a photoelectric cell which senses the presence of a person examining the display of which the mechanism forms a part. The motor, through a conventional system of gearing 37 and a drive bushing 38, selectively drives one or the other of the reels in a manner to be explained below.

A number of resilient or spring biased contact arms, here shown as four, may be mounted in contact with one face of the tape 22. The arm 40, which is common to several circuits, is connected to conductor 30. Arm 42 is connected to conductor 43 which leads to an actuating relay 44, which in turn is connected to conductor 32. When a circuit is closed through arms 40 and 42 the relay is actuated to produce any desired signal and may operate a light, or change an exhibit card, or start a display mechanism, or produce any other desired effect.

Arm 46 is connected to conductor 47 which leads to solenoid 48 and then joins conductor 32. Arm 50 is connected to conductor 53 which leads to solenoid 54 and then joins conductor 32. When a circuit is completed between either of these arms and the common arm 40 the respective solenoid is energized for a purpose to be explained hereinafter.

Figure 7:
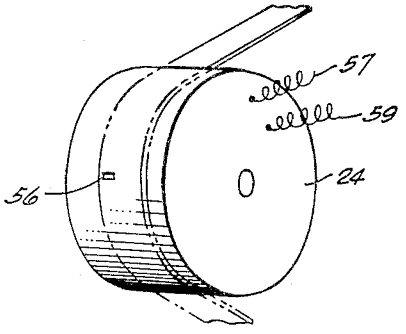
Figure 7 is a perspective view of a sound pickup head with a record tape shown in phantom lines.

The tape 22 carries a pair of sound tracks extending longitudinally side by side, each track being confined to one half of the tape, and the tracks being recorded in opposite directions of motion of the tape. As will be seen in Figure 7, the head 24 is provided with a pickup slot or point 56 to sense the magnetic variations in the sound track as the tape passes thereover. Conductors 57, 59 lead from the pickup to the amplifier 61 which in turn actuates speaker 63. The point 56 is centrally located in the head and the tape is laterally shiftable so that one sound track passes over the point as the tape travels in one direction and the other sound track passes over the point as the tape travels in the reverse direction. By means of the mechanism described herein the tape is automatically reversed in its travel and automatically shifted laterally at predetermined times.

A portion of gearing 37 is mounted on plate 58 which is slidably mounted in guide 60 for movement to left and right as seen in Figure 1. The plate is urged to the left by a light spring 62 and may be pulled to the right by pivoted arm 64 acting through spring 66 which is somewhat stronger than spring 62. In this figure the plate is in its rightward position with drive bushing 38 contacting reel 16, and arm 64 is held to the right by pivoted latch arm 68 which is resiliently held down by spring 70. The direction of rotation of drive bushing 38 is such that tape is being drawn on to reel 16 from reel 14.

A conductive area 72 is formed on the surface of the tape, as shown on reel 14. A satisfactory method is to cement a piece of metal foil to the surface of the tape which is formed of a non-conducting plastic. As the tape continues to travel upward from reel 14 the conductor or shorting strip 72 reaches a point where it completes the circuit between arms 50 and 40 which includes solenoid 54. The latter is energized and draws latch arm 68 up against the action of spring 70, releasing arm 64 and allowing plate 58 to be pulled to the left by spring 62 until the drive bushing 38 contacts reel 14. Immediately the direction of rotation of the reels is reversed and the tape 22 is drawn from reel 16 to reel 14.

At a predetermined point along the sound track where it is desired to again reverse the tape another shorting strip, not shown but similar to strip 72, is mounted on the surface of the tape. When this strip completes the circuit between arms 46 and 40 the solenoid 48 which is in this circuit is energized and arm 64 is drawn to the right until it is latched behind arm 68. The spring 66 overcomes the resistance of weaker spring 62 and yieldably holds the drive bushing against reel 16. The latter immediately reverses rotation and the tape is again driven in the direction described at the beginning of the sequence. Reversal takes place in approximately one-sixteenth inch of travel of the tape.

The arms 40 and 42 are closely spaced laterally but are not spaced longitudinally of the tape. Consequently, with a shorting strip such as shown at 72, the circuit will be completed through them and the actuating relay each time a reversing circuit is completed and the display device controlled by it will of course be put in action. Independent actuation of the relay can be accomplished by variations to be described later.

Figure 3:
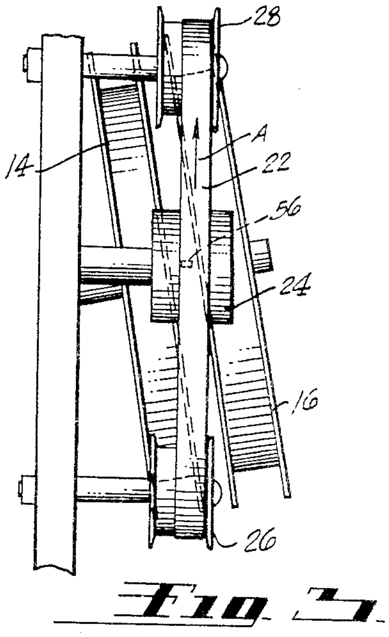
Figure 3 is a top plan view of the mechanism of Figure 2.
Figure 2:
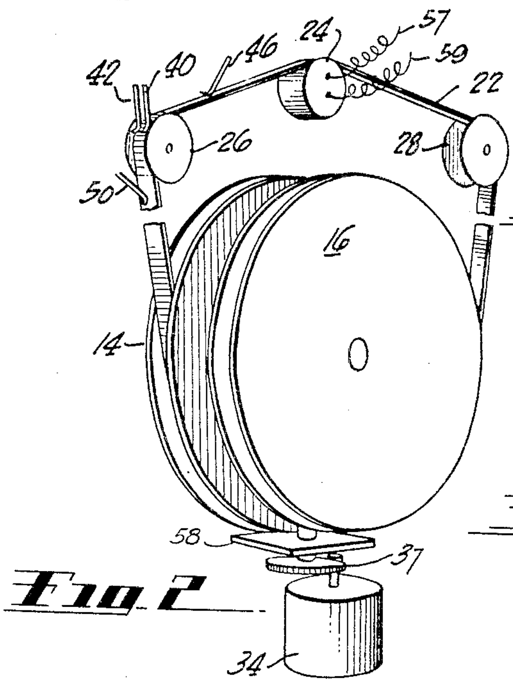
Figure 2 is a perspective view on an enlarged scale showing the relation of the pickup head to the driving means and guide means.
Figure 4:
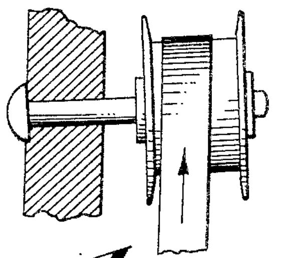
Figure 4 is an enlarged detail view of a guide roller and its mounting schematically illustrating the lateral shifting operation.

Obviously, if the tape movement were reversed without lateral shifting relative to the pickup point the same sound track would pass over the point and produce a garbled and useless signal. The necessary shifting is accomplished by the arrangement of parts best indicated in Figure 3. As shown here, the tape 22 is being transferred from reel 14 over roller 26, head 24, and roller 28 to reel 16 and is traveling in the direction of arrow A. In this situation the roller 26 is in effect a cone pulley with respect to reel 14, its axis being at a slight skew angle with respect to the longitudinal axis of the approaching tape, and the tape will creep or climb to the "high" side, or the right as viewed in this figure. The effective relation is shown in Figure 4 which somewhat diagrammatically shows a roller on an axis which is set at slightly less than a right angle to the longitudinal axis of the approaching tape which will, in a well known manner, creep or climb to the high side of the roller at the right of the figure.

Returning to Figure 3, it will be seen that a similar relation exists between roller 28 and reel 16. Consequently when the tape moves in the direction of arrow A it shifts to the right until it contacts the flanges on the right sides of the two rollers. The pickup point 56 is now under the left hand side of the tape and is actuated by the left hand sound track. When the direction of the tape drive is reversed, the relation of the parts is reversed and the tape, now traveling opposite to arrow A, shifts to the left side of the rollers and its right hand sound track is over point 56. The amount of shift is limited to one-half the width of the tape by virtue of the fact that the face of each roller between flanges is substantially one and one-half times the lateral width of the tape. This shift takes place in approximately one-tenth second so that there is practically no interruption in the transmission of messages from the tape to the amplifier. It will be understood that the flanges for rollers 26 and 28 may be stationary, allowing the rollers to rotate between them, thus serving as stationary guides.

Figure 5:
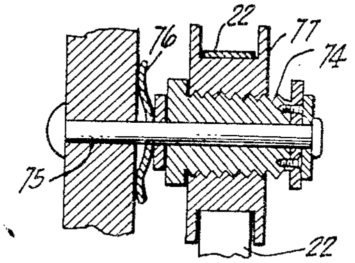
Figure 5 is a sectional view of another type of roller mounting.

A modified form of shifting device is shown in Figure 5 in which an externally threaded shaft 74 is mounted on an axle 75 for free rotation, being lightly braked by a spring washer 76. A flanged guide pulley 77 with a threaded bore is mounted on shaft 74. The pulley face is of the same width between flanges as the lateral width of the tape 22. When the tape traverses the pulley the latter first rotates on threaded shaft 74 and is driven laterally by the interengagement of the threads until the pulley abuts one of the flanges of the shaft. The pulley and shaft thereafter rotate as a unit on axle 75. When the direction of movement of the tape is reversed the pulley again rotates on the shaft and travels laterally until it contacts the opposite flange, whereafter the pulley and shaft again rotate as a unit. The tape 22, guided by the pulley, will be shifted one-half of its lateral width to cooperate with the pickup head in the same manner as in the first embodiment.

Figure 6:
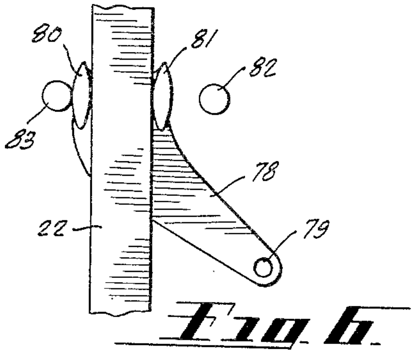
Figure 6 is a plan view of a pivotally mounted shiftable guide.

A third form of shifting or path control mechanism for the tape is illustrated in Figure 6 in which an arm 78 is pivotally mounted on a pivot pin 79 which is laterally displaced from the path of the tape. The free end of the arm crosses the path of the tape and is provided with guide means 80, 81 spaced apart the width of the tape. As the tape is drawn upward across the arm, as viewed in this figure, in contact therewith, the arm will be drawn around the pivot pin 79 until it strikes stop 82. When the tape movement is reversed the arm will be swung in the opposite direction until it strikes stop 83. The lateral movement of the arm between the stops is equal to one-half the width of the tape so that the latter can coact with the pickup head in the same manner as described above with respect to the first embodiment.

Figures 8 to 12 illustrate diagrammatically various circuit closing operations which are made possible by the formation of selected conductive areas on the tape surface and by the proper location of a desired number of contact arms. In each of these figures, the solid line showing represents the tape traveling in the direction of arrow B and the dotted line showing represents the tape traveling in the direction of arrow C, at which time it is also shifted laterally a distance equal to one-half the width of the tape.

Figures 8, 9, 10, 11, 12:
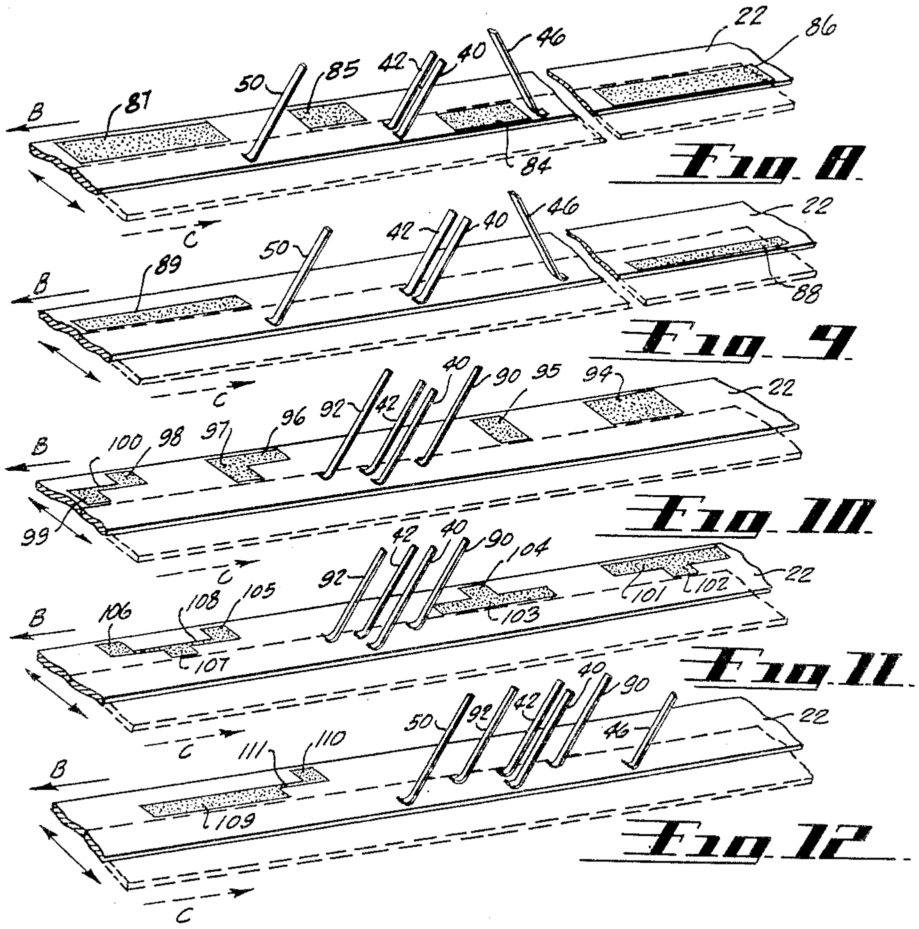
Figures 8, 9, 10, 11, and 12 are perspective views of a record tape and contact fingers, diagrammatically illustrating various circuit closing operations.

As shown in Figure 8, the shorting strip 84, approximately one-half the width of the tape, is about to short arms 40 and 42 and close a circuit through the actuating relay 44. If the tape were traveling in the reverse direction it would be shifted to the dotted line position and the strip 85 would short arms 40 and 42 in the same manner. These strips are not long enough to complete a circuit between the common arm 40 and the reversing arms 46 and 50. However, strips 86 and 87 are of such length, and when strip 86 has advanced to a point where it shorts arms 40 and 46 the reversing mechanism will come into play as described above, causing the tape to reverse its direction of movement and also to shift laterally. At the same time, the strip 86 will short arms 40 and 42, causing the actuating relay 44 to operate.

Figure 9 illustrates an arrangement for reversing the tape without energizing relay 44. In this case the strip 88 is only about one-fourth the width of the tape and when it reaches a position between arms 40 and 46 it will complete the circuit between them to initiate the reversing action but it is not wide enough to touch arm 42. Hence the relay 44 will not be energized. When the tape is traveling in the direction of arrow C, the strip 89, which is the counterpart of strip 88, will short arms 50 and 40 without touching arm 42 and will reverse the tape without energizing the actuating relay.

In Figure 10 the reversing contact arms have been left out for clarity of illustration and two additional arms 90 and 92 have been added so that three different external actuating relays may be energized to perform a plurality of functions. Arm 40 is again the common lead, and a completed circuit with any one of the other arms will actuate a corresponding external relay. As shown in this figure the arms 92, 42, and 90 are aligned in the direction of travel of the tape and arm 40 is laterally displaced from them. The shorting strips here shown are all on one side of the center line of the tape primarily for purposes of illustration and explanation. Assuming that the tape is now traveling to the right in the dotted line position in the direction of arrow C with the first shorting strip 94 just approaching the group of contact arms, it will be seen that this strip is wide enough to touch the single arm and the group, and is long enough to contact any adjacent two of the group. Hence, it will contact arm 92 with no effect, then also 42 and 40, actuating the relays connected to arms 92 and 42. As it continues on, it leaves 92 and contacts 90 so that the relays connected to 42 and 90 will now be actuated. When the trailing end of the strip leaves arm 40, all circuits are again opened.

The next strip, 95, is not long enough to contact two arms in the group so it will pass 92 without effect, short 40 and 42 to produce a signal, and pass 92 without effect.

The next strip has a long narrow portion 96 and a short broad portion 97. It will therefore pass 92 without effect and then short 40 with 42 and 90, actuating both of their relays.

The next strip has a short and narrow tab 98 near the margin of the tape, a second short and narrow tab 99 near the centerline of the tape, and a very narrow longitudinal bar 100 connecting them. It will be seen that as tab 98 passes 92 and 42 there will be no effect but when it reaches 90 the other tab 99 has reached 40 to complete a circuit between these two arms.

In connection with this last described form it may be pointed out here that the relay 36 of Figure 1 may be associated with an electrical lock-in device of known type included in the photo-electric circuit so that, once started, the motor 34 will continue to operate until a message is completed. The arm 90 may be in circuit with a relay which will cause release of relay 36 and, of course, the tabs 98, 99 are so placed on the tape that they will cause cessation of operation just as a message has been completed. The relay could alternatively be a simple, two-position, stepping relay, actuated by the photoelectric means to turn on the motor 34 and by the circuit through arm 90 to turn off the motor. Obviously any of the contact arms may be used to accomplish this purpose.

Three additional forms of shorting strips are shown in Figure 11 in association with the same contact arms shown in Figure 10. Assuming the same operation as described above, the first strip to reach the contact arms is composed of a long narrow portion 101 near the margin of the tape and a centrally located tab 102 extending to the center line of the tape. As the strip contacts arms 92 and 42 there will be no effect but when it reaches 90, the tab 102 will contact 40 and all three external relays will be actuated simultaneously.

The next strip is composed of a long narrow portion 103 near the centerline of the tape and a centrally located tab 104 extending to the margin. The tab 104 will contact arms 92, 42, and 90 seriately as the portion 103 continues in contact with 40 and the three external relays will be actuated one at a time.

The next strip is composed of two narrow tabs 105 and 106 longitudinally spaced, tab 107 centrally located, and a very narrow bar 108 connecting all of them. As this strip reaches the contact arms, circuits will be complete between arm 40 and arms 92 and 90, actuating their relays without any effect on arm 42 and its relay.

Figure 12 illustrates the same arrangement as Figures 10 and 11 plus the reversing contact arms 50 and 46. The shorting strip includes a long narrow portion 109 near the center line of the tape, a tab 110 longitudinally spaced from 109 and adjacent the margin of the tape, and a very narrow bar 111 connecting them. When this strip reaches the contact arms, tab 110 will touch arms 92 and 42 without effect because no closed circuit is created. However, when it reaches arm 90 a circuit is closed to actuate the relay connected therewith and at the same time the circuit made between arms 50 and 40 will cause reversal of movement of the tape.

An alternative manner of operating some of the circuits is to make rollers 26 and 28 of metal, arrange them in desired circuits, and to form apertures in the tape at selected places so that one or more of the contact arms may contact the metal rollers to complete the circuits.

It will be seen that by the above described and other arrangements of shorting strips and contact arms it is possible to cause actuation of one or more external signal devices and actuation of the reversing relays in any predetermined time relation to the message or messages recorded on the sound tracks. Thus, when a customer stops to examine an advertising display a photo-electric cell will sense his presence and start the driving motor. The speaker will present an audible message and at appropriate times the external actuating relays will change an exhibit card, operate a light, or cause other suitable operations of the device, including turning it off at the proper time. The mechanism can deliver a long continuous message or repeat one or more short messages for an indefinite time.

It will be obvious to those skilled in the art that various changes and modifications may be made in the features of construction and operation of the mechanism and it is intended that all such changes and modifications shall be embraced in the scope of the following claims.

We claim:

1. A sound reproducing device comprising: a pair of storage reels; means mounting said reels for rotation about their axes; a length of record tape attached to said reels and having an intermediate portion extending between them; a pickup head located adjacent to said intermediate portion to be traversed thereby as the tape passes from one reel to the other; guide means located between said head and each of said reels in guiding contact with said tape to guide it in one longitudinal path upon movement of said tape in one direction and in another longitudinal path laterally displaced from said first path upon movement of said tape in the reverse direction; and means to selectively drive said tape in each of said directions, said guide means being actuated solely by the forces generated thereat by longitudinal movements of the tape thereagainst in opposite directions to effect transfer of said tape laterally from the one longitudinal path to the other longitudinal path.

2. Control means for a sound reproducing device of the type having a pickup head with a pickup point and a record tape with two laterally spaced longitudinally extending sound tracks thereon longitudinally movable past said head and laterally shiftable with respect thereto, comprising: power means to selectively drive said tape in longitudinally opposite directions; means in contacting relation with a face of said tape and effective upon reversal of the direction of driving of said tape to shift said tape laterally with respect to said pickup head, said means being rendered effective in opposite lateral directions solely by the forces generated thereat by longitudinal movements of the tape thereagainst; means to contact one side edge of the tape to limit its lateral movement in one direction to guide one of said sound tracks over said pickup point; and means to contact the other side edge of the tape to limit its movement in the opposite lateral direction to guide the other of said sound tracks over said pickup point.

3. Control means as claimed in claim 2 in which the means for shifting said tape laterally and for limiting the extent of its lateral movement comprise a roller having a face width equal to approximately one and one-half times the lateral width of the tape and having a flange at each end thereof; said roller being mounted for free rotation about an axis substantially normal to the longitudinal axis of said tape; said axis being angularly displaced from a true normal sufficiently to cause the tape to ride laterally across the roller face until a side edge of the tape contacts one of said flanges.

4. Control means as claimed in claim 2 in which the means for shifting said tape laterally and for limiting the extent of its lateral movement comprise a roller having a face width substantially equal to the lateral width of the tape and having a flange at each end thereof; said roller being mounted for rotation on a shaft having an axis substantially normal to the longitudinal axis of said tape; and means interengaging between said shaft and said roller to shift the roller axially along said shaft in reverse directions in response to reverse rotations of said roller on said shaft.

5. Control means as claimed in claim 2 in which the means for shifting said tape laterally and for limiting the extent of its lateral movement comprise a pivotal support laterally displaced from the longitudinal axis of said tape and having a pivot axis extending substantially normal to the plane of said tape; an arm mounted on said pivotal support and extending across the path of said tape in sliding relation therewith; and a pair of guide means on said arm and spaced apart a distance substantially equal to the width of said tape to contact the side edges thereof; said arm being swingable laterally in opposite directions in response to movement of said tape in opposite longitudinal directions and operable to shift said tape laterally therewith.

6. Control means for a sound reproducing device having a fixed pickup head with a pickup point and a record tape with two laterally spaced longitudinally extending sound tracks thereon longitudinally movable past said head and laterally shiftable with respect thereto, comprising: means to selectively drive said tape in longitudinally opposite directions; and means made effective upon reversal of the direction of driving of said tape to shift said tape laterally with respect to said head to guide one of said sound tracks over said pickup point during one direction of driving of said tape and to guide the other of said sound tracks over said pickup point during the opposite direction of driving of said tape, said means being rendered effective on opposite lateral directions solely by the forces generated thereat by longitudinal movements of the tape thereagainst.

7. A sound roproducing device, comprising: a pair of storage reels; means mounting said reels for rotation about their axes; a record tape having a plurality of longitudinally extending sound tracks arranged thereon side-by-side, said tape being attached to said reels and transferable from one to the other upon rotation thereof; a pickup head transversed by said tape in its longitudinal movement; means to rotate said reels to transfer said tape from one reel to the other; a pair of spaced contact fingers in contact with a surface of said tape and connected to a source of electric power; electrically conductive means of limited extent on a portion of the surface of said tape and laterally limited to one of said sound tracks, said conductive means being adapted to bridge the gap between said contact fingers when said sound track is aligned therewith and thus close the circuit therethrough in the course of longitudinal movement of said tape; actuating means in series with said contact fingers energized by the closing of said circuit; and means actuated by the lateral and longitudinal forces exerted by the longitudinally moving tape for automatically shifting said so moving tape laterally upon occurrence of said reverse movement of said tape, said conductive means being thereby shifted out of the path of contact with said contact fingers upon said occurrence.

8. A sound reproducing device, comprising: a pickup head; a record tape longitudinally movable past said head in opposite directions and laterally shiftable upon reversal of its direction of movement; means actuated solely by the lateral and longitudinal forces exerted thereon by the longitudinally moving tape for automatically shifting said so moving tape laterally upon occurrence of said reverse movement; a pair of contact fingers in contact with a surface of said tape and connected to a source of electric power; electrically conductive means of limited extent on a preselected portion of the surface of said tape adapted to bridge the gap between said contact fingers and close the circuit therethrough in the course of longitudinal movement of said tape in one direction and to by-pass said contact fingers in the course of longitudinal movement of said tape in the opposite direction; and means energized by the closing of said circuit to produce a signal in predetermined timed relation to the sound produced by said pickup head.

9. A sound reproducing device, comprising: a pickup head; a record tape longitudinally movable past said head in opposite directions and laterally shiftable upon reversal of its direction of movement; means actuated by the forces exerted thereon by the longitudinally moving tape for automatically shifting said so moving tape laterally upon occurrence of said reverse movement; at least three contact fingers in contact with a surface of said tape and connected to a source of electric power, said fingers being arranged in such a pattern with reference to each other and to the directions of tape movement as to be differentially operative upon occurrence of said shiftings; electrically conductive means of limited extent on a preselected portion of the surface of said tape adapted to bridge the gaps between said contact fingers and close the circuits therethrough in the course of longitudinal movement of said tape in one direction and to by-pass said contact fingers in the course of longitudinal movement of said tape in the opposite direction; one of said contact fingers being common to the plurality of circuits; and means energized by the closing of said circuits to produce signals in predetermined timed relation to each other and to the sound produced by said pickup head.

10. A sound reproducing device, comprising: a pair of storage reels; means mounting said reels for rotation about their axes; a record tape attached to said reels and transferable from one to the other upon rotation thereof; a pickup head traversed by said tape in its longitudinal movement; power means to rotate said reels in alternate directions to transfer said tape from one reel to the other; means actuated by the forces exerted thereon by the longitudinally moving tape for automatically shifting said so moving tape laterally upon occurrence of said reverse movement; a pair of spaced contact fingers arranged side-by-side in contact with a surface of said tape and connected to a source of electric power; electrically conductive means of limited extent on a portion of the surface of said tape adapted to bridge the gap between said contact fingers and close the circuit therethrough in the course of longitudinal movement of said tape in one direction and to by-pass said contact fingers in the course of longitudinal movement of said tape in the opposite direction; and means actuated by the closing of said circuit to reverse the direction of rotation of said reels.

References Cited in the file of this patent

UNITED STATES PATENTS

| | | |
|---|---|---|
| 1,116,580 | Feaster | Nov. 10, 1914 |
| 1,223,771 | Day | Apr. 24, 1917 |
| 1,499,521 | Hagemann | July 1, 1924 |
| 1,634,984 | Dickhaut | July 5, 1927 |
| 1,852,236 | Fenner | Apr. 5, 1932 |
| 1,915,613 | O'Neill | June 27, 1933 |
| 2,182,928 | Mehaffey | Dec. 12, 1939 |
| 2,275,961 | Heller | Mar. 10, 1942 |
| 2,338,414 | De Sart | Jan. 4, 1944 |
| 2,468,198 | Heller | Apr. 26, 1949 |
| 2,542,506 | Gibson | Feb. 20, 1951 |
| 2,606,766 | Kuhlik | Aug. 12, 1952 |

FOREIGN PATENTS

| | | |
|---|---|---|
| 294,086 | Italy | Mar. 11, 1932 |